Dec. 20, 1966  C. HOROWITZ  3,292,655
FLOW SENSING SHUTOFF VALVE
Filed June 16, 1964
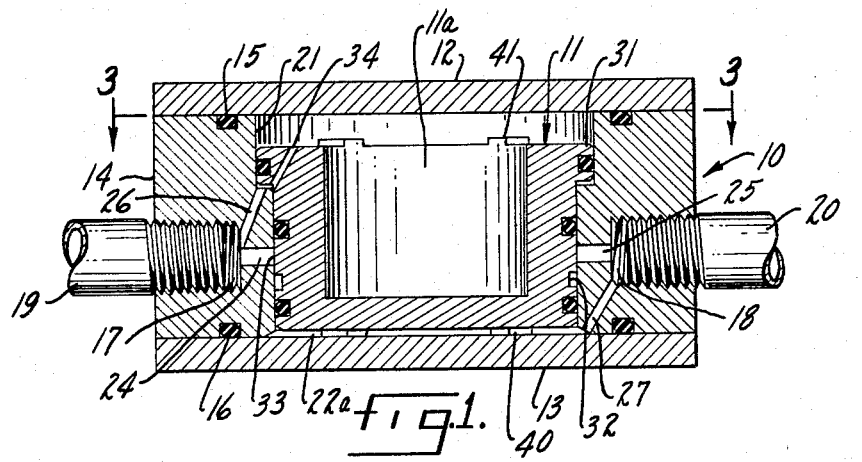
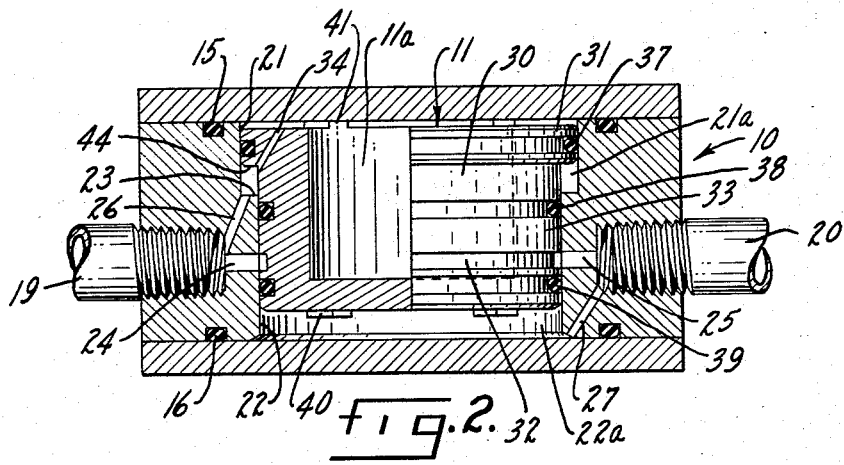
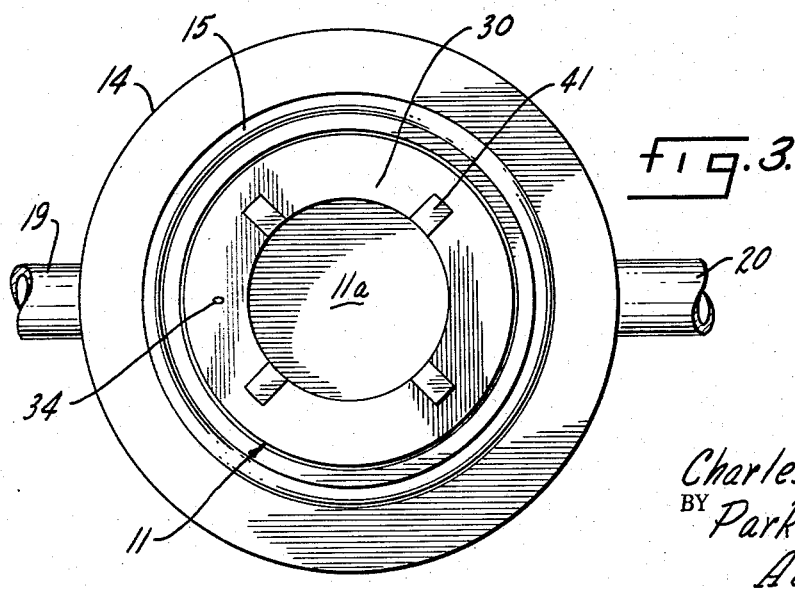
INVENTOR.
Charles Horowitz,
BY Parker & Carter
Attorneys.

United States Patent Office 3,292,655
Patented Dec. 20, 1966

3,292,655
FLOW SENSING SHUTOFF VALVE
Charles Horowitz, Chicago, Ill., assignor, by mesne assignments, to Berg Mfg. & Sales Co., Des Plaines, Ill., a corporation of Illinois
Filed June 16, 1964, Ser. No. 375,609
10 Claims. (Cl. 137—456)

The present application is a continuation-in-part of now abandoned application, Serial No. 206,704, filed July 2, 1962, for "Flow Sensing Shutoff Valve."

This invention relates to fluid flow shutoff devices, and particularly to such a device which has only one moving part and is automatically responsive to a downstream pressure drop to shut off fluid flow through a line in which it is installed.

Fluid flow shutoff devices are essential in many applications for safety and operating reasons. If a break should occur in a hydraulic line leading to a hydraulic cylinder the oil in the system may spill out onto the floor creating a mess and often all of the oil in the system must be replaced. If the oil contacts hot surfaces, such as in die casting machines, a fire hazard is presented if flamable oil is used. Flamable oil has certain advantages over non-flamable oil and is often preferred. Some sort of fluid shutoff device is therefore essential in order to prevent loss of oil and eliminate fire hazards.

Another conventional application for shutoff devices is fuel lines for airplanes. Should a gas leak occur in the fuel line adjacent an engine, the gas may spurt out against the hot engine. All airplanes have an automatic $CO_2$ system which operates as soon as a fire breaks out, but once the $CO_2$ is exhausted there is nothing to prevent another fire if gas continues to leak against the still hot engine. The pilot may try to shut the engine off but even if he succeeds the engine will stay hot for a considerable time period.

The pilot may also have difficulty shutting off the fuel pump, particularly if a siphon or upstream pressure has been established. So long as the engine stays hot the danger of fire exists, and if a fire breaks out the burning fuel will keep the engine hot.

Accordingly, a primary object of this invention is to provide a pressure responsive fluid flow shutoff device installable in a fluid pressure line which is automatically responsve to a drop in pressure downstream of the device to shut off further flow in the line.

Another object is to provide such a device which is simple, lightweight, and has only one moving part.

Yet another object is to provide a pressure responsive fluid flow shutoff device which is automatically responsive to a drop in pressure downstream of the device to shutoff, and maintain shutoff, further fluid flow until it is manually reset or the system bled down and operating pressure conditions reestablished.

Another object is to provide a pressure responsive fluid flow shutoff device having a delayed pressure buildup which prevents premature shutoff of the device due to low downstream pressure, thereby enabling a downstream pressure to be established initially.

Yet a further object is to provide a pressure responsive fluid flow shutoff device having a time delay shutoff feature which prevents premature shutoff to thereby enable downstream pressure buildup upon initial application of pressure, but instant shutoff in response to a drop in downstream pressure subsequent to the initial application of pressure.

Other objects and advantages of the invention will become apparent upon a reading of the following description of the invention.

The invention is illustrated more or less diagrammatically in the accompanying figures wherein:

FIGURE 1 is a section view through the device in a closed position;
FIGURE 2 is a similar section through the device in an opened postion; and
FIGURE 3 is a section taken substantially along the line 3—3 of FIGURE 1.

Like reference numerals will be used to refer to like parts throughout the following description of the drawings.

The device consists essentially of a casing 10 within which a spool valve member 11 reciprocates. The casing consists essentially of top and bottom plates 12 and 13 and a barrel portion 14. Any suitable means may be used to secure the top and bottom plates to the barrel portion. A pair of O-ring seals 15 and 16 prevent leakage of fluid between the barrel and top and bottom plates. Inlet 17 and outlet 18 are connected respectively to inlet pipe 19 and outlet pipe 20.

The casing forms in effect a chamber 22a within which the spool valve member 11 reciprocates. The chamber has an upper, expanded diameter portion 21 and a lower, reduced diameter portion 22. A shoulder 23 is formed between the upper and lower portions. An inlet passage 24 connects the inlet opening to chamber 22a and an outlet passage 25 connects the outlet opening to chamber 22a. An auxiliary flow passage 26 extends upwardly from the inlet and terminates at the shoulder 23. Backfill passage 27 extends downwardly from the outlet opening 18 to the bottom end of chamber 22a.

The spool valve member 11 comprises a barrel portion 30 which terminates at its upper end in an overhanging flange 31 in sliding engagement with the upper, expanded section 21 of the chamber. A notch or groove 32 in the periphery of the spool valve member is so located along the smaller diameter barrel portion that when the spool is in the upward, open position of FIGURE 2 the inlet and outlet passages 24, 25 are placed in communication with one another. In this instance the groove 32 and the internal surface of the casing 14 provide a fluid flow path between the inlet and outlet, but it should be understood that within the scope of the invention the path may be formed entirely within the spool valve member. When the spool is in the closed position of FIGURE 1, land 33 is aligned with the inlet and outlet passages 24, 25 and flow between the inlet and outlet is blocked.

A flow retarder or restricting passage 34 is cut diagonally through the flange 31 of the spool and terminates, at its upper end, at the upper surface of the spool, and, at its lower end, approximately at the junction between the flange and lower barrel portion of the spool valve member. The position of the restricting passage may be varied but it must extend between the small expandable chamber 21a formed beneath the flange 31 and above shoulder 23.

Three O-ring seals 37, 38, 39 prevent leakage of pressure fluid between the surface of the spool and the chamber.

A plurality of projections extending downwardly from the bottom of the spool valve are indicated at 40. If more than one is used they are so designed as to extend downwardly equal distances so that when the spool is in the closed position all are in abuting engagement with the top surface of bottom plate 13, as shown in FIGURE 1. Similarly, a plurality of projections 41 are carried by and extend upwardly from the top surface of flange 31 of the spool. One or more may be used but if a plurality are used, they are of such a length that all make abutting engagement with the lower surface of top plate 12 when the spool is in the open position of FIGURE 2.

Referring to FIGURES 1 and 2 it will be noted that the bottom surface of the spool is spaced above the bottom plate a distance equal to the length of the projections even when the spool is in the fully closed position, and similarly, the top surface of the spool is spaced below the under surface of the top plate 12 a distance equal to the thickness of projections 41 even when the spool is in the fully opened position of FIGURE 2.

The casing and spool member may be of any suitable material including metals and plastic. The O-ring seals may be of any material having the characteristics of rubber as to flexure and compressibility. The size of the shutoff device may be varied widely since it is not limited by any maximum pressure. In a device suitable for use with ½ inch high pressure lines, the spool valve member might advantageously weigh on the order of about 6 ounces.

The use and operation of the invention are as follows:

When there is no pressure in the line in which the device is connected, the spool valve will be in the fully closed position of FIGURE 1. It will be recognized that the structure of the invention is operable in any position. When the valve is in the horizontal position shown in the drawings, the frictional engagement of O-rings 37, 38, 39 is sufficient to resist the affect of gravity on the spool valve element 11. Similarly, when pressures are equal on opposite sides of spool 11, said friction will insure maintenance of spool 11 in the open position of FIGURE 2 against the affect of gravity when in said horizontal position shown. It will be understood that any suitable means (not shown) may be employed for seating the spool valve in the position shown in FIGURE 1 prior to initial delivery of fluid, such as air or liquid, under pressure to inlet 19.

When pressure fluid is initially admitted through line 19, the spool will immediately move to the position of FIGURE 2. This is due to the impingement of the pressure fluid against the undersurface 44 of flange 31 from auxiliary passage 26. Surface 44 is in effect a first pressure area against which pressure from the inlet is exerted, and is, of course, movable with the spool member.

As soon as the spool valve moves to the FIGURE 2 position the inlet and outlet are placed in communication with one another since notch 32 will then line up with inlet and outlet passages 24, 25. As soon as the pressure fluid commences to flow out of outlet 18, pressure will similarly be exerted against the bottom of the spool valve by reason of passage of pressure fluid from the outlet through backfill port 27 into the expandable space 22a beneath the spool.

The bottom of the spool, including the lower faces of the projections 40, provide, in effect, a second pressure area against which pressure is exerted in a valve opening direction.

Almost simultaneously with admission of high pressure fluid into the small expandable chamber 21a, the pressure fluid will begin to fill up the hollow space or reservoir 11a within the spool. Since projections 41 maintain the upper end of the spool out of contact with the lower face of plate 12, the pressure fluid passing through restricting passage 34 will merely spill over (when the fluid is liquid and the device is in the position shown) into the chamber. Since the diameter of the flow restricting aperture 34 is smaller than auxiliary passage 26, and backfill passage 27, the reservoir will not be filled until after chambers 21a and 22a have been filled and the pressure is fully effective against shoulder 44 and the bottom of the spool. The restrictor provides, in effect, a pressure buildup delay. When the pressure is equalized above and below the spool valve, the spool will remain in a FIGURE 2 position.

So long as the pressure in outlet 18 is equal to the pressure at inlet 17 the spool will remain in the FIGURE 2 position.

Should a leak occur in the hydraulic line 20 downstream from the device, pressure in outlet 18 will drop below the inlet pressure at 17. This drop will likewise occur in the larger expandable chamber 22a beneath the spool valve. The force urging the spool valve in a closing direction will then immediately return the valve to the closed position of FIGURE 1 due to the decay in pressure beneath the spool valve. When in the FIGURE 1 position, land 33 blocks fluid communication between passages 24, 25, and O-ring seals 38, 39 prevent any fluid leakage between the spool and casing. Thus, further flow through the valve is automatically prevented.

Once the spool valve moves to the closed position, and so long as inlet pressure is maintained, the valve will be positively urged into the closed position. Even when the inlet pressure is relieved, the valve will remain in the FIGURE 1 position due to the weight of the spool and the weight of the fluid in reservoir 11a when the device is positioned as shown in the drawings and the fluid is liquid. The friction of O-rings 37–39 will overcome the effect of gravity if the device be inverted.

When the leak in outlet line 20 has been repaired, reesrvoir 11a may be redrained (when the fluid is liquid) or the valve can be returned to the FIGURE 2 position by a plunger (not shown) and inlet pressure again applied. If the structure be drained of liquid, the delivery of inlet pressure at 19, as above described, will move the spool 11 from the closed position of FIGURE 1 to the open position of FIGURE 2. The same is true when air is the fluid and the air pressure in the structure has been exhausted through a suitable exhaust valve (not shown) communicating with inlet 19. The employment of a plunger or the opening of the valve structure to drain or exhaust the same is required only after the valve of the invention has automatically operated to close communication between inlet 19 and outlet 20 and liquid or air pressure remains trapped in the area above, as the parts are shown in the drawings, the spool 11 and in passages 24, 26, 34 and reservoir 11a.

Thus it will be apparent that upon an initial application of inlet pressure the spool will move upwardly because the pressure exerted on the spool in a valve-opening direction builds up at a faster rate than the counterpressure exerted on the spool in a downward valve-closing direction. The projections 41 serve the purpose of spacing the upper edge of the reservoir a short distance below the upper plate 12 to thereby provide clearance for the admission of hydraulic fluid to the reservoir from restricting valve 34.

Bottom projections 40 likewise space the spool a short distance above the bottom plate 13 to provide a clearance for the receipt of pressure fluid through backfill passage 27.

One of the great advantages of the invention is the fact that a wide range of time delays may be built into the device to thereby prevent premature shutoff. Thus, by varying the size of restricting aperture 34, and the size of passages 36, 22 and 27, sufficient time can be provided for inlet pressure to be built up in the expandable chamber 22a beneath the spool. At startup the downstream pressure will, of course, be zero, and if the inlet pressure does not exist in chamber 22a before reservoir 11a fills, the valve will immediately shut off. After the initial pressure buildup, however, a subsequent drop in the downstream line pressure will immediately automatically cause the spool to move to the closed position of FIGURE 2, and to remain there until the device is reset. Preferably, the device may be reset by use of a ball check valve (not shown) in a line in communication with the reservoir in the spool, the ball check being so arranged that upon displacement from its seat, fluid will be drained from the reservoir. Alternatively, the valve may be uncapped, the hydraulic fluid poured out, and recapped.

Whereas a preferred embodiment of the invention has been illustrated and described, it will be understood that further modifications will suggest themselves to those skilled in the art upon reading of the foregoing specification. Accordingly, the foregoing description should be There is claimed:

1. A pressure responsive fluid flow shutoff device, said shutoff device including, in combination, a housing, said housing having an inlet and outlet, said inlet and outlet being adaptable for connection into a fluid pressure line, a chamber in the housing, a valve member in the chamber movable between a closed position, in which it blocks fluid flow from the inlet to the outlet, to an open position in which the inlet and outlet are in communication through a fluid flow path, said valve member having a first surface responsive to fluid pressure within said housing for moving the valve member from the closed position to the open position upon the initial application of line pressure at the inlet, said valve member having a second surface responsive to downstream pressure in said pressure line and cooperative with said first surface to maintain the valve member in the open position, said valve member having a third surface responsive to said line pressure at said inlet to automatically return the valve member to the closed position upon a predetermined drop in downstream pressure, said first and second surfaces together being substantially equal in effective pressure area to said third surface.

2. A pressure responsive fluid flow shutoff device including a housing having an inlet and an outlet, a valve member in said housing, said valve member having a first pressure area in communication with the pressure at the inlet, said first pressure area being so disposed as to urge the valve member into an open position upon exposure of said first pressure area to inlet pressure, a second pressure area in communication with the pressure at the outlet, said second pressure area being so disposed as to urge the valve member into an open position upon exposure of said second pressure area to outlet pressure, a third pressure area, said third pressure area being so disposed as to urge the valve member into a closed position upon exposure of said third pressure area to inlet pressure and in response to a predetermined diminution of pressure on said second pressure area, and means communicating said third pressure area with the inlet and retarding pressure buildup against the third pressure area upon initial application of inlet pressure to the valve member, the effective size of said third pressure area being greater than that of said first pressure area, the effective size of the sum of said first and second areas being substantially equal to that of said third pressure area.

3. The pressure responsive fluid flow shutoff device of claim 2 further characterized in that the communicating retarding means includes a flow restrictor passage between the inlet and third pressure area which retards passage of pressure fluid therethrough, and, consequently, the rate of pressure buildup against the third pressure area as compared to the rate of pressure buildup against the first and second pressure areas.

4. A pressure responsive fluid flow shutoff device effective to shut off fluid flow through a line on which it is connected in response to a drop in line pressure downstream from the shutoff device, said shutoff device including, in combination, a housing, said housing having an inlet and outlet connectable to a fluid pressure line, a chamber in the housing, said chamber being connected to the inlet and outlet by passages, and a spool valve slidable in the chamber and reciprocable between a closed position in which the spool valve blocks the inlet and outlet passages to an open position in which the spool valve places the inlet and outlet passages in communication with one another, said spool valve comprising a cup-shaped cylinder having a radially outwardly extending flange adjacent one end, said flange being aligned with and resting upon a shoulder in the housing, an auxiliary passage between the inlet passage and the shoulder whereby inlet pressure fluid may be directed against the underside of the spool valve flange, a backfill passage between the outlet passage and the expandable chamber volume beneath the spool valve, a flow-restricting passage having a diameter less than that of said auxiliary and backfill passages and extending between the space formed beneath the spool valve flange and above the housing shoulder and the expandable chamber volume above said one end, first sealing means between the spool valve flange and upper end of the casing, second sealing means between the spool valve and that portion of the housing beneath the shoulder and above the connection of the inlet and outlet passages to the chamber, third sealing means between the spool valve and the housing beneath the connection of the inlet and outlet passages to the chamber.

5. A pressure-responsive fluid flow shutoff device, said shutoff device including, in combination, a housing, said housing having an upstream inlet and downstream outlet, said inlet and outlet being adaptable for connection into a fluid pressure line, a chamber in the housing, a unitary valve member in the chamber movable solely in response to fluid pressures in said chamber between a closed position, in which it blocks fluid flow from the inlet to the outlet, to an open position in which the inlet and outlet are in communication through a fluid flow path, said valve member having a first surface responsive to fluid pressure thereagainst within a first portion of said chamber for moving the valve member from a closed position to the open position upon application of line pressure at the inlet, a second surface responsive to fluid pressure thereagainst within a sceond portion of said chamber for maintaining the valve member in the open position, and a third surface reponsive to fluid pressure thereagainst within a third portion of said chamber for automatically returning the valve member to the closed position in response to a drop in downstream pressure, restricted passage means between said first and third chamber portions for retarding pressure buildup within said third chamber portion upon application of inlet pressure to the valve member, passages communicating said inlet with said first surface and said outlet with said second surface, said restricted passage means having a diameter less than that of said passages.

6. A valve structure including a housing, an inlet and an outlet in said housing, a valve positioned in said housing and controlling communication between said inlet and outlet, said valve being movable automatically and solely in response to fluid pressures in said housing, passage means communicating said inlet with a first portion of said valve to move said valve toward open position, a second passage means communicating said outlet with a second portion of said valve to move said valve toward open position, and a third passage means communicating said inlet with a third portion of said valve to move said valve toward closed position upon diminution of pressure in said second passage means, said first and second portions having a combined effective pressure area substantially equal to the effective pressure area of said third portion.

7. A valve structure including a housing, an inlet and an outlet in said housing, a fluid-pressure-responsive valve positioned in said housing and controlling communication between said inlet and outlet, passage means communicating said inlet with a first portion of said valve to move said valve toward open position, a second passage means communicating said outlet with a second portion of said valve to move said valve toward open position, and a third passage means communicating said inlet with a third portion of said valve to move said valve toward closed position upon diminution of pressure in said second passage means, said third passage means having a cross-sectional area smaller than that of said first and second passage means, said first and second portions having a combined effective pressure area substantially equal to the effective pressure area of said third portion.

8. A valve structure including a housing, an inlet and an outlet in said housing, a valve positioned in said housing for movement therein substantially solely in response to fluid pressures therein and controlling communication between said inlet and outlet, passage means communicating said inlet with a first portion of said valve to move said valve toward open position, a second passage means communicating said outlet with a second portion of said valve to move said valve toward open position, and a third passage means communicating said inlet with a third portion of said valve to move said valve toward closed position upon diminution of pressure in said second passage means, said third passage means communicating with said inlet through said first passage means, said first and second portions having a combined effective pressure area substantially equal to the effective pressure area of said third portion.

9. A valve structure including a housing, an inlet and an outlet in said housing, a fluid-pressure-responsive valve positioned in said housing and controlling communication between said inlet and outlet, passage means communicating said inlet with a first portion of said valve to move said valve toward open position, a second passage means communicating said outlet with a second portion of said valve to move said valve toward open position, and a third passage means communicating said inlet with a third portion of said valve to move said valve toward closed position upon diminution of pressure in said second passage means, said third passage means communicating with said inlet through said first passage means and having a smaller diameter than said first passage means, said first and second portions having a combined effective pressure area substantially equal to the effective pressure area of said third portion.

10. A valve structure including a housing, an inlet and an outlet in said housing, a valve positioned in said housing and controlling communication between said inlet and outlet, passage means communicating said inlet with a first portion of said valve to move said valve toward open position, a second passage means communicating said outlet with a second portion of said valve to move said valve toward open position, and a third passage means communicating said inlet with a third portion of said valve to move said valve toward closed position upon diminution of pressure in said second passage means, said third passage means communicating with said inlet through said first passage means and having a smaller diameter than said first passage means, said first and second passage means being of the same diameter, said first and second portions having a combined effective pressure area substantially equal to the effective pressure area of said third portion.

References Cited by the Examiner
UNITED STATES PATENTS 2,943,636  7/1960  Reed et al. _____ 137—460 X WILLIAM F. O'DEA, *Primary Examiner.*

ISADOR WEIL, SAMUEL FEINBERG, *Examiners.*

D. ROWE, H. WEAKLEY, *Assistant Examiners.*